Sept. 30, 1969  H. O. WAGNER  3,469,474
HORIZONTAL BORING MACHINE FOR MACHINING THE INTERIOR OF HOUSINGS
Filed July 21, 1967  7 Sheets-Sheet 4

INVENTOR
Hans O. Wagner

INVENTOR
Hans O. Wagner

Sept. 30, 1969  H. O. WAGNER  3,469,474
HORIZONTAL BORING MACHINE FOR MACHINING THE INTERIOR OF HOUSINGS
Filed July 21, 1967  7 Sheets-Sheet 6

INVENTOR
Hans O. Wagner
By

United States Patent Office 3,469,474
Patented Sept. 30, 1969

3,469,474
HORIZONTAL BORING MACHINE FOR MACHINING THE INTERIOR OF HOUSINGS
Hans O. Wagner, Dusseldorf, Germany, assignor to Schiess Aktiengesellschaft, Dusseldorf, Germany
Filed July 21, 1967, Ser. No. 655,053
Claims priority, application Germany, July 21, 1966, Sch 39,294
Int. Cl. B23b 39/00, 29/08
U.S. Cl. 77—3      7 Claims

ABSTRACT OF THE DISCLOSURE

The present invention relates to a horizontal boring machine for machining the interior of large, preferably one-piece generator housings, turbine housings or the like, which comprises two stands between which the housing to be bored can be counted, through which housing the boring head is to be moved.

The present invention is characterized primarily in that the boring head equipped with a rotatable tool carrier is supported by a supporting beam and movable in longitudinal direction thereof, said supporting beam being movable on and selectively firmly connectable to said stands.

The present invention relates to a horizontal boring machine for machining the interior of large, preferably undivided, generator, turbine or similar housings, which machine comprises two stands arranged on a machine bed between which the housing may be placed the interior of which is to be bored and through which the boring head can be moved.

With a heretofore known horizontal boring machine, a boring spindle is journalled in the stands which boring spindle is driven from one end while a boring head is displaceable in conformity with the desired feed on and rotatable with said boring spindle.

The said horizontal boring machine has, however, the drawback that for maintaining the required tolerance as to the bore alignment in the housing, the bend of the boring spindle which carries the boring head requires the insertion of steady rests by means of which the boring spindle is supported within the housing bore. In this connection it is essential that the steady rests are located as close to the boring head as possible which means at the location of the greatest bend which fact makes necessary a frequent displacement and new adjustment of said steady rests. This in turn involves a considerable setting time.

Moreover, the "threading" of the boring spindle into the housing to be bored causes difficulties and is time consuming. Finally, the operator when observing the chip removing machining in the housing, is frequently endangered by the boring spindle which rotates over the entire length of the housing while in addition thereto the steady rest or rests impede the freedom of movement of the operator.

As mentioned above, the "threading" of the boring spindle causes particular difficulties because the spindle has to be passed through the housing along its entire length and has its free end journalled in a second stand. As a rule, the free end of the spindle bends considerably and additionally requires in the stand, which comprises the drive, special bearing and driving elements which make possible the longitudinal feeding of the boring spindle through the housing so that the free end of said spindle can be journalled in the other stand.

When long work pieces or housing bores are involved, it is indispensible to employ special supporting carriers which move on rails inserted in the housing bore and thus involve a considerable amount of handling time and thereby idling periods of the machine.

Another horizontal boring machine, a so-called "jaw boring mill" comprises a spindle box displaceable on the machine bed and provided with a beam fixedly connected thereto. The tool and the tool carrier are continuously driven by a shaft in said beam or boom. The feeding movement is carried out by the spindle box. This embodiment has over the above mentioned horizontal boring machine the advantage that the bend of the beam will with the same tool or tool carrier weight remain unchanged and that the time consuming "threading" of the boring spindle will become unnecessary.

A considerable drawback, however, consists in that for reasons of static and dynamic stability of the machine, the beam cannot be extended to any desired length. If a housing is involved the interior of which is to be bored and the length of which exceeds the length of the beam, a machining is possible only over a partial length and from one side so that the boring operation has to be repeated from the other housing side. This mode of operation requires a very precise resetting of the housing to be bored by 180° which, as a rule, requires a crane or a special turntable. While the resetting by means of a crane is rather time consuming and may be the cause of mistakes, a turntable makes the machine rather expensive.

Starting from a horizontal boring machine of the above mentioned first type, it is an object of the present invention to provide a machine of the said type so that a boring spindle rotating over the entire length of the housing to be bored will become superfluous.

It is another object of this invention to provide a horizontal boring machine as set forth in the preceding paragraphs, which will not require the "threading" operation.

It is still another object of this invention to provide a horizontal boring machine as set forth above, in which deviations from the machining operation due to bending and leading to a lowering of the boring head can be reduced and limited to the permissible tolerance.

These and other objects and advantages of the invention will appear more clearly from the following specification in connection with the accompanying drawings, in which.

Figure 10:
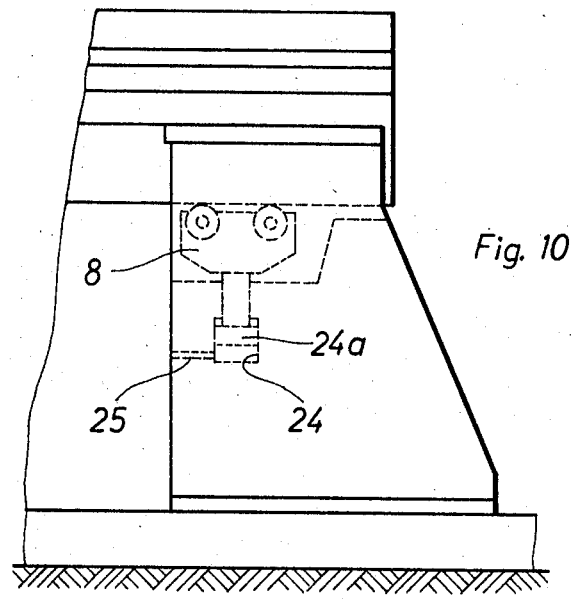

FIG. 10 diagrammatically illustrates the hydraulic lifting mechanism for the roller supports adapted to support the tool carrier.

Figure 11:
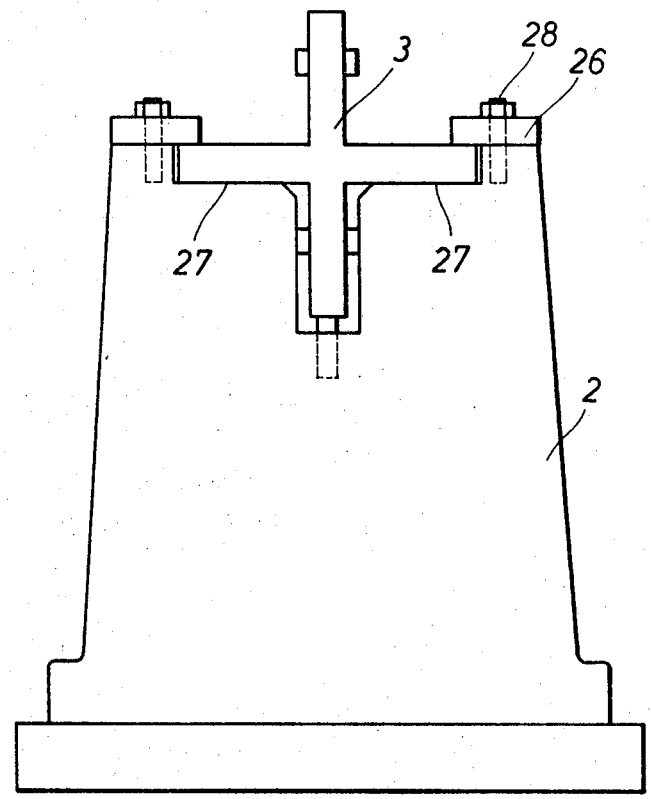

FIG. 11 is a view of one of the stands with the tool carrier clamped thereonto.

The boring machine according to the present invention is characterized primarily by a longitudinally displaceable beam adapted to be clamped to the stands and having displaceably arranged thereon a boring head equipped with a rotatable tool carrier. The boring head is by means of a drive of its own displaceable on said beam on guiding rails. An arrangement of this type brings about that only a non-rotating beam is to be passed through the housing to be bored which beam during its passage through the housing can be supported by a stand and which for the passage of its free end requires only a temporary additional support.

Furthermore, the present invention makes it possible to compensate for the bending of the beam by its own weight and said boring head movable thereon. To this end, the guiding surfaces of said guiding rails on the beam for the boring head are so mounted and machined that, when the beam bends together with the guiding rails, the boring head will move completely rectilinearly on the guiding surfaces so that during the movement of the boring head an offsetting of the axis of rotation will not occur.

While a boring spindle has to be supported in its bearings and has to be advanced, with a non-rotating beam, sliding or clamping rails on the beam will suffice while the easy displaceability of the beam for passing the beam through the housing is made possible according to the invention by the fact that the beam can be supported on the stands on height-adjustable rollers and is displaceable.

The beam may thus for purposes of displacement be lifted off from and displaced relative to its sliding and clamping rails and can be lowered again when reaching its position of application when it is clamped to the stands.

According to a further development of the present invention, below the boring head and mounted thereon is a support which is adjustable as to height and by means of which during the longitudinal movement of the support the boring head can be supported in the interior of the housing. Advantageous conditions as to space with regard to the arrangement of a drive of its own for the boring head can be realized in conformity with the present invention by providing the beam with a cross-shaped cross section while the boring head extends around the beam and may rest on said beam along two planes perpendicular to each other. This support may be effected for instance by rollers so that an easy longitudinal displaceability of the boring head will be assured. Between the legs of the beam the driving elements of the drive may be located so that the dimensions of the boring head will not materially exceed the dimension of the cross section of the beam.

According to a further development of the invention, the dislacement of the boring head along the beam or beams with regard to the boring head, when the latter is held by its support, can be made possible by providing the beam with a rack extending over its entire length, said rack meshing with a feeding element of the drive.

The said drive may also serve for driving the tool carrier. To this end, according to the present invention, the tool carrier is designed as a rotor ring extending around the boring head. This ring is provided with inner teeth meshing with the rotary drive of the drive pertaining to the boring head. Inasmuch as the boring head has a drive of its own, the said drive is considerably less expensive than the drive for a boring spindle. This is due to the fact that in contrast to heretofore known boring spindle drives, it is no longer necessary to provide a boring spindle which extends over the entire length of the housing and has to be rotated over said length. According to the present invention, the masses to be driven are therefore considerably less. Moreover, torsion oscillations as they occur with a boring spindle drive when the spindle is driven from one end are eliminated. Also the feeding drive in axial and radial direction is considerably more rigid because long threaded spindles and shafts as they are customary with heretofore known boring machines within the boring spindle become superfluous.

Referring now to the drawings in detail, the horizontal boring machine illustrated therein primarily comprises two stands 1 and 2 arranged on the machine bed 19. Of these stands, stand 1 is displaceable. The stands 1 and 2 are equipped with guiding and clamping rails by means of which the tool carrier 3 can be braced against and clamped onto the stands 1 and 2. Such clamping arrangement is best illustrated in FIG. 11 which shows the tool carrier 3 clamped by means of clamping plates 26 and bolts 28 against the surfaces 27 of the stand 2.

For purposes of displacing the beam 3 on the stands 1 and 2, in said stands 1 and 2 below the beam 3 there are provided roller supports 8 which are adapted to be raised hydraulically and are also adapted to be lowered. More specifically, the stands 1 and 2 are equipped with a cylinder 24 having reciprocably mounted therein a piston 24a carrying the roller support 8. From a supply source (not shown) fluid under pressure is passed through a bore 25 into cylinder 24 for lifting roller support 8. When the pressure below piston 24a drops, roller body 8 is lowered by its own weight. By raising the beam 3, it disengages its guiding and clamping rails and thus will be freely displaceable on the rollers of the roller support 8. By lowering the roller supports 8, said beam or carrier 3 will contact its clamping and guiding rails 4 and can thus be braced or clamped to the stands 1 and 2.

Figure 2:
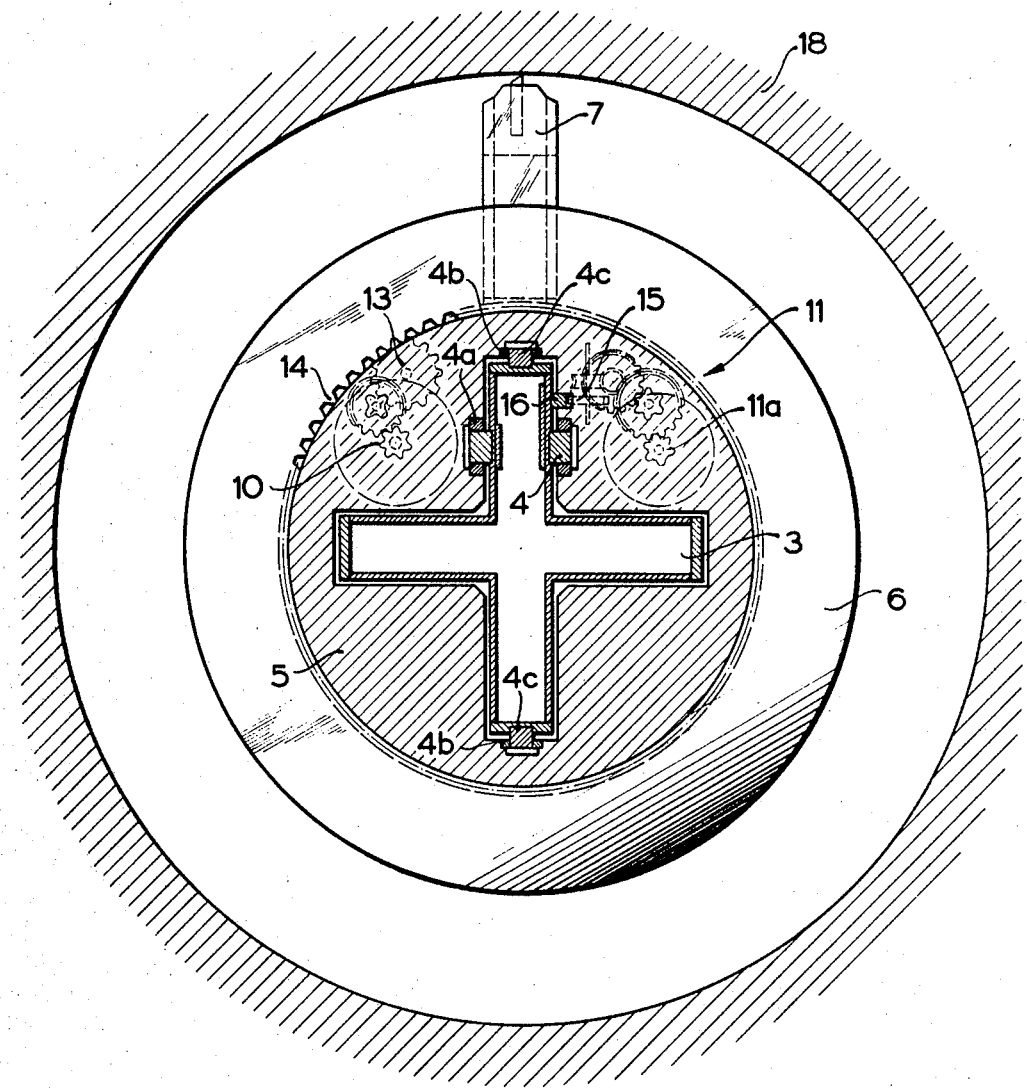
FIG. 2 is a section taken along the line II—II of FIG. 1.
Figure 3:
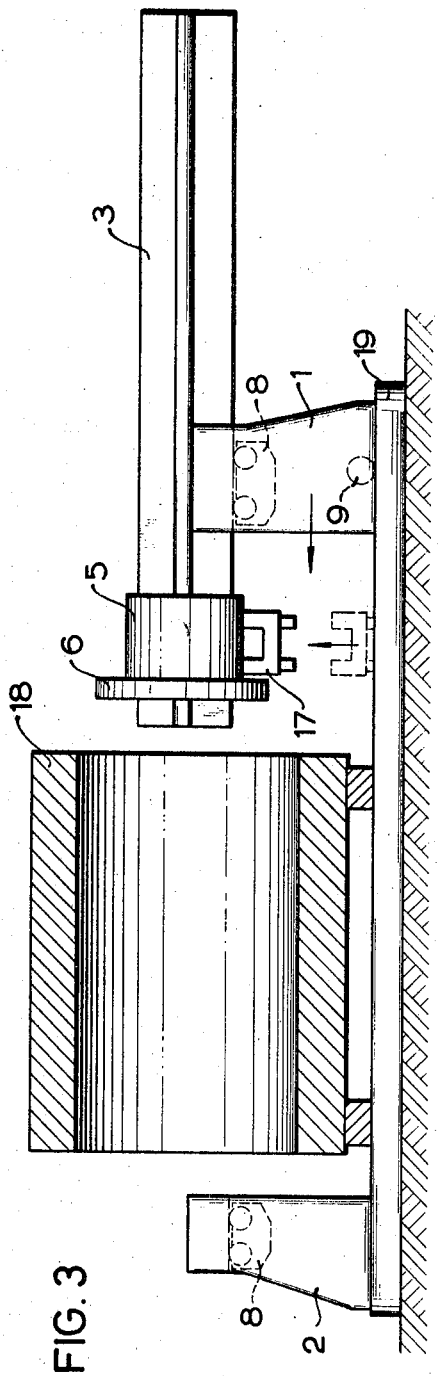
FIG. 3 illustrates on a somewhat reduced scale over that of FIGS. 1 and 2 the introduction of the supporting beam into the housing to be bored, said beam occupying its starting position.
Figure 4:
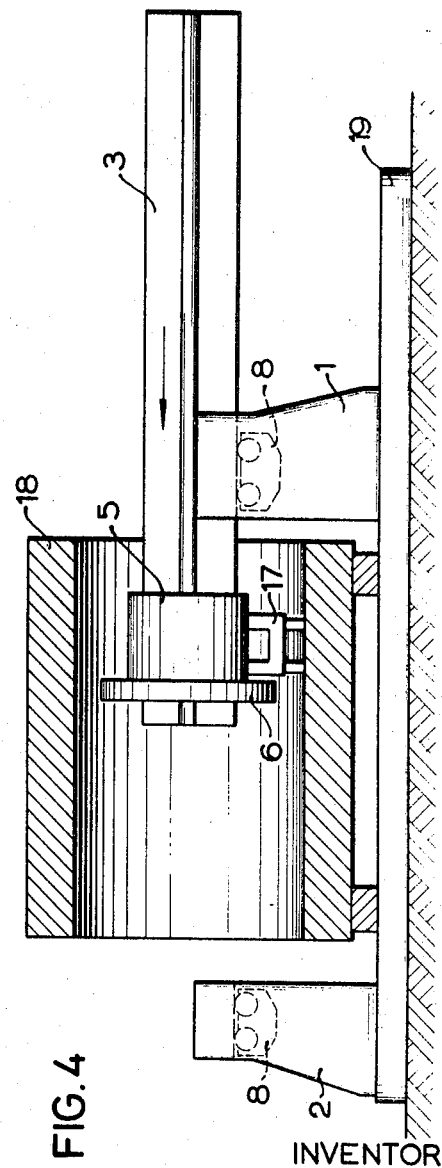
FIG. 4 is a section and view similar to that of FIG. 3 but showing the beam with the tool carrier partly inserted into the housing to be bored.

Longitudinally displaceably mounted on beam 3 is a boring head 5 with its own driving motor to which is directly connected one of the drives illustrated in FIG. 2. An annular tool carrier 6 with its tool holder 7 extends around the boring head 5 while being rotatable by a motor 10 which is followed by a transmission.

Figure 1:
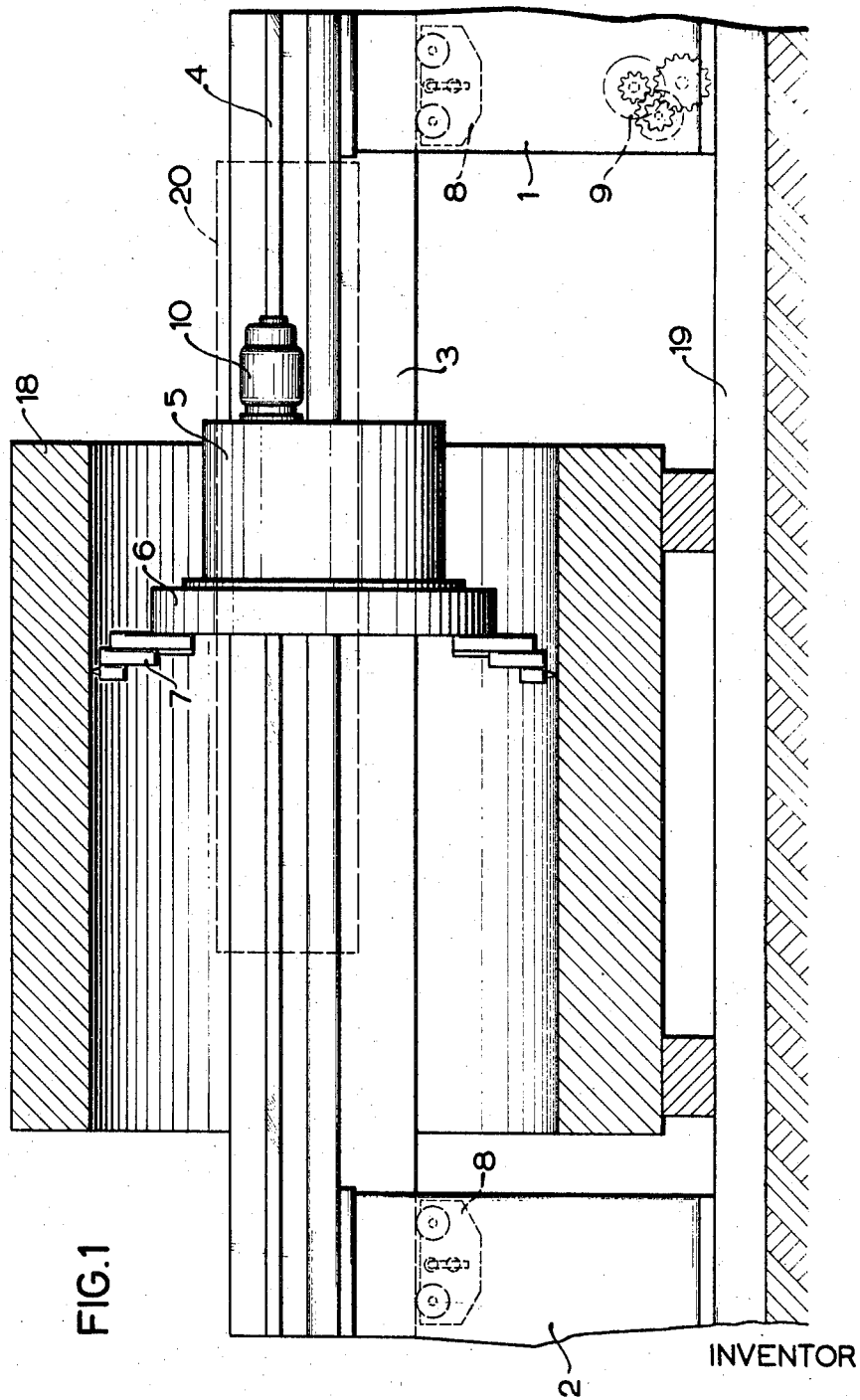
FIG. 1 is a portion of a horizontal boring machine, partially in section and partially in view, showing the boring head during the boring of a large one-piece generator housing.

FIG. 1 shows the tool carrier 6 in its starting position, the housing 18 being machined by means of the tools of the rotating tool carrier 6.

The beam or carrier 3 is designed strong and to this end preferably has a cross-shaped cross section, preferably welded together. The boring head 5 is longitudinally displaceable on beam 3 by means of a drive motor M which through the intervention of pinions 11a (FIG. 2) drives the transmission generally designated 11. Gear 15 of transmission 11 meshes with the rack 16 which is mounted on the upwardly directed leg of the beam 3. Thus, the longitudinal feeding movement of the boring head 5 is brought about by the transmission 11 and by the meshing of the gear 15 with the rack 16. The boring head 5 rests on the guiding rails 4 and 4c, which are preferably hardened rails, by means of the play-free adjustable roller elements 4a and 4b. The boring head is thus supported along two planes arranged vertically with regard to each other while a proper guiding of the boring head 5 is assured on the beam 3.

Rotatably journalled on the boring head 5 is the annular tool carrier 6 which is driven by the motor 10 through the transmission associated therewith. Gear 13 of said transmission meshes with the interior gear ring 14 of the annular tool carrier 6. One or more tool holders 7 are connected to the tool carrier 6.

FIG. 1 additionally illustrates in dash lines the cover 20 for the guiding rails 4, 4c and the rack 16 which cover 20 is mounted on the boring head 5 and covers the beam 3 from the top so that the guiding rails will be kept free from chips or the like.

Figure 7:
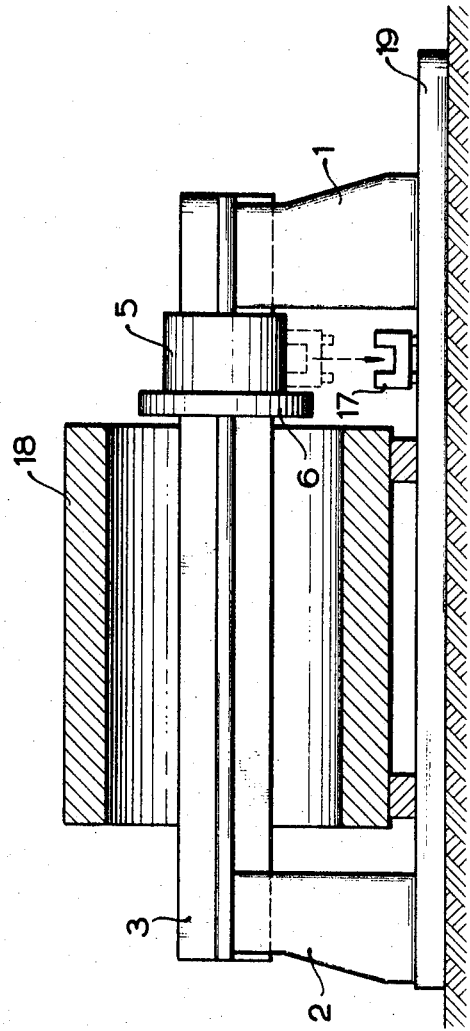
FIG. 7 shows a horizontal boring machine according to FIG. 1 prior to the boring operation.
Figure 9:
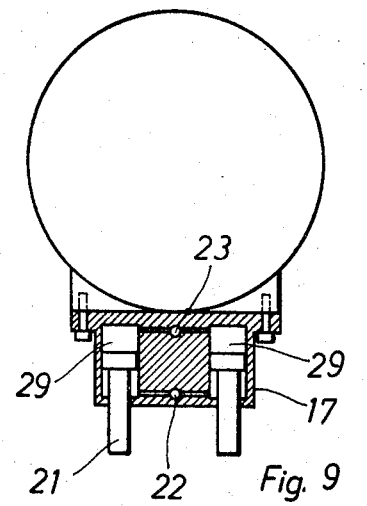
FIG. 9 is a section along the line IX—IX of FIG. 8.
Figure 8:
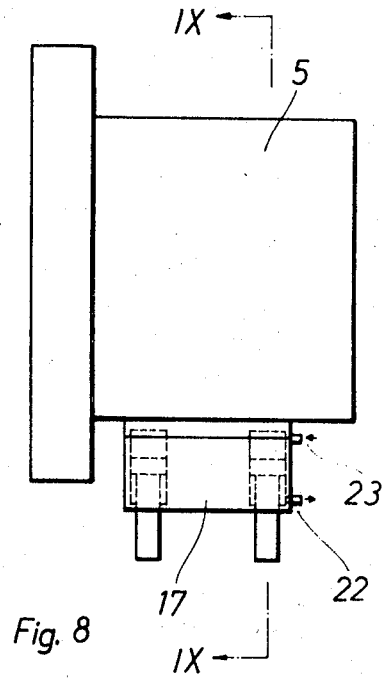
FIG. 8 illustrates on a somewhat larger scale than FIG. 1 supporting means for the boring head 5.

FIGS. 3 to 7 illustrate in detail the setting of the machine. After the housing 18 to be machined has been properly set on the machine bed 19 within the working area between the two stands 1 and 2, the stand 1 supporting the beam 3 slightly at a point toward the right from its center of gravity, is, according to FIG. 3, displaced on the machine bed 19 by drive 9 toward the housing 18 to such an extent that the boring head 5 has entered the housing 18 to a corresponding extent. Below and to the boring head 5 there is fastened a support 17 by means of which, in conformity with FIG. 4, the boring head 5 rests on the inner surface of the housing 18 to be bored. The support 17 at the bottom of the boring head 5 is provided with supports which are adjustable as to height so that these supports can be adapted to and be adjusted in conformity with the inner surface of the housing 18 to be bored. Consequently, the support 17 absorbs the weight of the boring head 5 and a portion of the weight of the beam 3. FIGS. 8 and 9 show details of the support 17. As will be seen from FIGS. 8 and 9, the support 17 is screwed onto the boring head 5. Said support 17 has, according to the specific embodiment shown, built thereinto four hydraulically operable supporting plungers 21. An oil pump (not shown) conveys oil under pressure either through bore 22 or 23 into the cylinders 29 below or above the plunger piston portions 30 for lifting or lowering said plungers 21.

Figure 5:
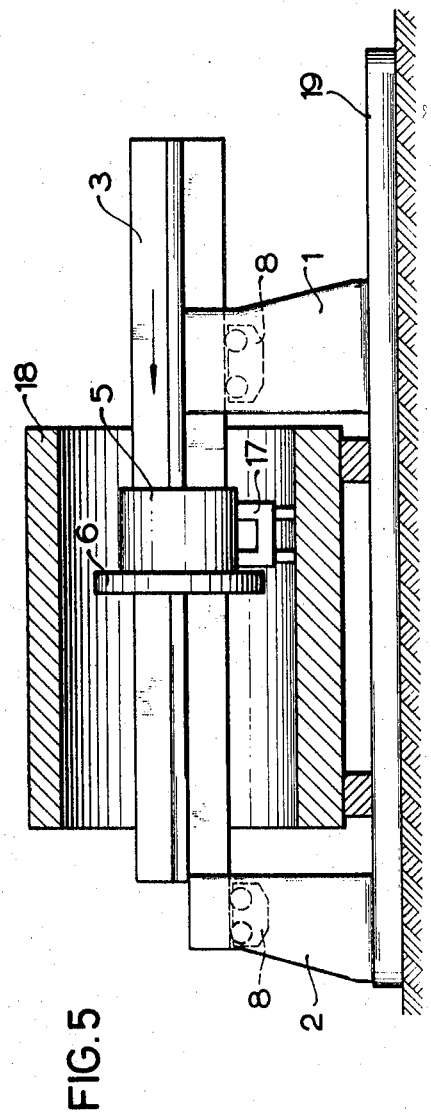
FIG. 5 shows the free end of the beam rested on the respective adjacent stand.
Figure 6:
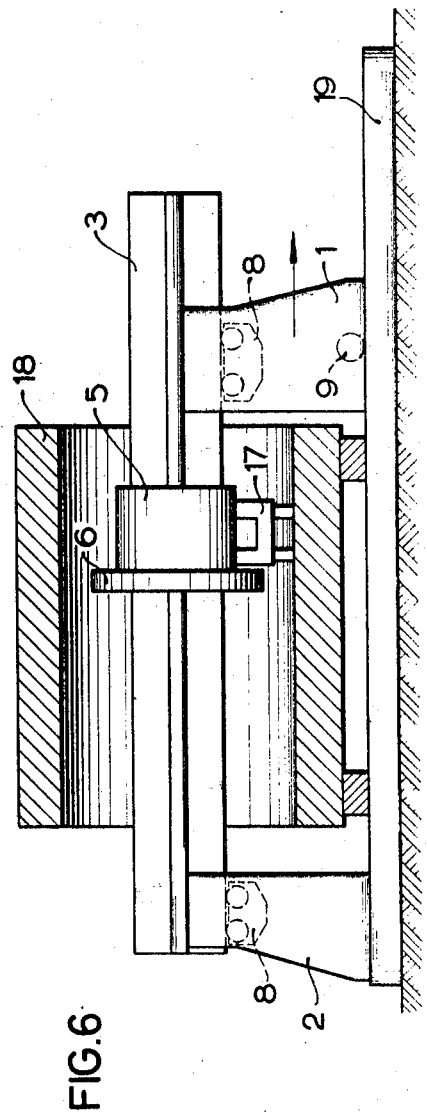
FIG. 6 shows the beam with the boring head after the free beam end has been clamped to the second stand.

When the clamping or bracing between the stand 1 and the beam 3 is relieved and when the feeding drive 11 of the boring head 5 has been engaged, the feeding drive 11 of the boring head 5 moves the beam 3 resting on stand 1 upon the roller support 8 into the housing 18. The beam 3 thus moves toward the stand 2 as illustrated in FIG. 5. When the beam 3 has reached its clamping position with regard to stand 2, the roller support 8 in the stand 2 is lowered and the beam 3 is connected to the stand 2.

Subsequently, the stand 1 moves on the machine bed 19 in conformity with FIG. 7 toward the right up to the outer end of the beam 3 so that between the stand 1 and the housing 18 there will be a space in which the boring head 5 can be placed together with the tool carrier 6. In this position, following the lowering of the roller support 8, the beam 3 is clamped to the stand 1. After the boring head 5 is, in conformity with FIG. 7, moved into the above mentioned area, the support 17 can be removed, and the horizontal boring machine will occupy its starting position for the required boring operation.

If now the feed for the boring head 5 is started and, as the case may be, the tool carrier 6 is rotated by its own drive, namely the motor 10 with transmission, the boring head 5 will in conformity with the feed move through the housing 18 whereby the housing 18 will be bored by the tools or the tool of the tool carrier 6. Following the boring operation and after relieving the clamping engagement with the stands 1 and 2, and after the roller supports 8 with the boring head 5 have been raised, the beam 3 is in reversed order of the displacement movements moved out of the housing 18 until the beam 3 and the boring head 5 again occupy the position shown in FIG. 3. The return movement of the beam 3 may be carried out by the feeding drive in the boring head 5. To this end, the boring head 5 is through support 17 supported by the inner surface of housing 18 and held fast.

The employment of a non-rotatable beam on which the boring head is longitudinally displaceable by means of a feeding drive makes it possible prior to the mounting or prior to the rectilinear machining of the guiding rails to bend the beam in conformity with the maximum bend to be expected with the mounting of the boring head, and in this position to effect the mounting or machining of the guiding rails which will then not follow the bending line of the beam but will yield a straight guide the deviations of which will be within the prescribed limits.

The machine according to the present invention, therefore, considerably improves the machining precision over heretofore known machines of the type involved while being characterized by an improved static and dynamic stability based on equal longitudinal movements of the tool. In addition thereto, the drive of its own in the boring head assures a short power flow of the boring and feeding drives and makes it possible to carry out the longitudinal displacement of the beam by means of the boring head feeding drive. To this end, the boring head 5 is held fast by its support 17 while the weight of the beam 3 during the longitudinal displacement thereof is absorbed by said support 17 which also prevents a bending which would otherwise make difficult the resting of the beam 3 on the stand 2.

Since solely the tool carrier 6 rotates, the operator is not endangered and the checking possibility on the part of the operator is considerably improved.

Similar to heretofore known boring machines, the present invention likewise makes possible by inserting exchangeable machining tools to machine for instance both end faces of housing 18 in one and the same setting thereof. Similarly, bores can be provided in the end faces, and radial grooves can be machined into the end faces. Also longitudinal and/or radial grooves and radial bores can be machined into the housing bore.

For purposes of machining the end face on the side where the stand 2 is located, it would be necessary, in contrast to the showing of FIG. 1, also to provide a space between the stand 1 and the housing 18 where the tool carrier 6 can be placed. In this instance, the boring tools shown in FIG. 1 would be replaced by corresponding boring and milling tools with a drive of their own. In such an instance the rotary ring as tool carrier 6 would, of course, not rotate but would be tilted only similar to an indexing head into the respective working position. The required feed in axial direction would be carried out by the forward feed for the boring head 5 and, as the case may be, by a corresponding design of the transmission also the radial feed of the tool holder 7 could be carried out by the feed drive of the boring head 5.

It is, of course, to be understood that the present invention is, by no means, limited to the particular construction shown in the drawings but also comprises any modifications within the scope of the appended claims.

What I claim is:

1. A horizontal boring machine for machining the interior of large housings, especially one-piece housings, in particular for generators and turbines, which includes: a first stand and a second stand arranged in spaced relationship with regard to each other, supporting means intermediate said stands for supporting a housing the interior of which is to be bored, a supporting beam having its longitudinal axis extending in the direction from one stand to the other stand, said supporting beam being supported by said first stand and being movable toward and onto said second stand while having such a length as to be able to rest simultaneously on both said first stand and said second stand, a boring head supported by and guided on said supporting beam for movement thereon in the longitudinal direction of said supporting beam, tool holding means rotatably mounted on said boring head for receiving machining tool means, driving means supported by said tool head and drivingly connected to said tool holding means for rotating the same, and means respectively associated with said first and second stands for selectively connecting said supporting beam thereto.

2. A machine according to claim 1, which includes guiding means arranged on said supporting beam for guiding said boring head, said guiding means having its guiding surfaces so machined that when said beam with said boring head thereon bends during a machining operation said boring head will move along a substantially rectilinear path.

3. A machine according to claim 1, which includes roller means respectively associated with said stands for selectively supporting said supporting beam, said roller mean being adjustable as to height.

4. A machine according to claim 1, which includes a support deatchably connected to said boring head for supporting the same when moving said supporting beam through a housing to be bored, said support being adjustable as to height.

5. A machine according to claim 1, in which said supporting beam has a cross-shaped cross-sectional contour, said boring head being supported by supporting beam surfaces arranged substantially perpendicular to each.

6. A machine according to claim 1, which includes additional driving means and rack means supported by said supporting beam and extending in the longitudinal direction thereof, said rack means being drivingly connected to said additional driving means.

7. A machine according to claim 1, in which said tool holding means comprises an annular member with inner teeth, and in which said driving means includes gear means meshing with teeth of said annular member.

References Cited

UNITED STATES PATENTS

| | | | |
|---|---|---|---|
| 2,432,943 | 12/1947 | Shaw | 77—57 |
| 3,103,135 | 9/1963 | Widmer et al. | 77—3 |
| 3,383,957 | 5/1968 | McCann | 77—56 |

GERALD A. DOST, Primary Examiner

U.S. Cl. X.R.

77—56, 57